(12) United States Patent
Schweitzer

(10) Patent No.: US 11,122,794 B2
(45) Date of Patent: Sep. 21, 2021

(54) UNIVERSAL GAME CALL

(71) Applicant: J&P Outfitters, LLC, Linden, MI (US)

(72) Inventor: Paul Schweitzer, Linden, MI (US)

(73) Assignee: J&P Outfitters, LLC, Linden, MI (US)

( * ) Notice: Subject to any disclaimer, the term of this patent is extended or adjusted under 35 U.S.C. 154(b) by 393 days.

(21) Appl. No.: 16/257,736

(22) Filed: Jan. 25, 2019

(65) Prior Publication Data
US 2019/0230916 A1    Aug. 1, 2019

Related U.S. Application Data

(60) Provisional application No. 62/622,309, filed on Jan. 26, 2018.

(51) Int. Cl.
| | |
|---|---|
| *A01M 31/00* | (2006.01) |
| *A63H 5/00* | (2006.01) |
| *G10K 5/00* | (2006.01) |

(52) U.S. Cl.
CPC ............ *A01M 31/004* (2013.01); *A63H 5/00* (2013.01); *G10K 5/00* (2013.01)

(58) Field of Classification Search
CPC .............................. A63H 5/00; A01M 31/004
USPC .......................... 446/202, 203, 207, 208, 209
See application file for complete search history.

(56) References Cited

U.S. PATENT DOCUMENTS

| | | | | |
|---|---|---|---|---|
| 4,612,001 A | * | 9/1986 | Burnham | A01M 31/00 446/208 |
| 4,950,201 A | * | 8/1990 | Sceery | A01M 31/004 446/207 |
| 6,106,357 A | * | 8/2000 | Weiser | A01M 31/004 446/207 |
| 7,145,067 B2 | * | 12/2006 | Pfortmiller | A01M 31/004 84/380 R |
| 10,058,090 B2 | * | 8/2018 | Billy | A01M 31/004 |
| 10,327,438 B2 | * | 6/2019 | Heegaard | F16B 1/00 |
| 10,779,527 B2 | * | 9/2020 | Wilson | A01M 31/004 |
| 2010/0240275 A1 | * | 9/2010 | Rowley | A01M 31/004 446/208 |

* cited by examiner

*Primary Examiner* — Joseph B Baldori
(74) *Attorney, Agent, or Firm* — The Dobrusin Law Firm, PC

(57) ABSTRACT

A universal game call includes a barrel having an exhaust end and an intake end and a first inner diameter and the exhaust end and a second inner diameter at the intake end. The barrel is configured to connect to a plurality of calls and accessory pieces. The first call includes an insert end and a reed positioned within the insert end and configured to extend into the barrel when the call is joined to the exhaust end of the barrel. The second call includes an insert end and a mouthpiece end and a reed positioned within the mouthpiece end and extending away from the second call, exterior to the call and barrel. When the first call is connected to the barrel, a first animal sound is produced by forcing air through the barrel from its intake end. When the second call is connected to the barrel, the second animal sound is produced by forcing air through the reed.

11 Claims, 17 Drawing Sheets

UNIVERSAL GAME CALL

FIELD OF INVENTION

This application claims priority to U.S. Provisional Patent Application No. 62/622,309 filed on Jan. 26, 2018 and entitled UNIVERSAL GAME CALL, which is hereby incorporated by reference.

FIELD OF INVENTION

The field of invention relates generally to an animal call, and more specifically to an adaptable animal call for configuring numerous animal calls.

BACKGROUND

Game call devices have been employed by hunters for ages and are intended to attract particular species by producing sounds selected to imitate mating or other sounds made by the animal or fowl of interest to the hunter. Game calls have been designed to target specific game and animals, thus requiring a different mechanical call for attracting each animal. Accordingly, hunters that hunt numerous animals need many different calls for attracting such animals. Storing and keeping track of each of these calls can be tedious. Further, individual calls are often not adaptable to specific hunting situations.

Accordingly, an improved universal game call is needed in the art.

SUMMARY

A universal call is generally provided. The universal call includes a hollow barrel having an open exhaust end and an open intake end. The barrel includes a first inner diameter at the exhaust end and a second inner diameter, different from the first inner diameter, at the intake end. The barrel is configured to connect to at least a first call or a second call. The first call includes an insert end and an exhaust end, the insert end configured to be inserted into the exhaust end of the barrel. A first reed is positioned within the insert end of the first call and configured to be inserted into the hollow barrel when the first call is inserted into the exhaust end of the barrel. The universal call may be reconfigured to replace the first call with the second call. The second call includes an insert end and a mouthpiece end, the insert end configured to be inserted into the exhaust end of the barrel. A second reed that corresponds to the second call is positioned within the mouthpiece end of the second call and configured to extend out of the mouthpiece away from the second call.

In use, the universal call may produce a first animal sound when the first call is inserted into the exhaust end of the barrel and air is blown through the intake end of the barrel and exits through the exhaust end of the first call. The universal call may produce a second animal sound when the second call is inserted into the exhaust end of the barrel and air is blown through the mouthpiece end and second reed and exits through the intake end of the barrel.

In an embodiment, the first call may comprise one of a deer grunt call, a duck call, a goose call, a wood duck call, a single reed duck call, a double reed duck call, a speckle bellied goose call, an owl call, a rabbit call, a squirrel call, a woodpecker call, and a raccoon call. The second call may comprise one of a cow elk call, a coyote call, a fawn elk cry call, and a crow call.

In an embodiment, a universal keg may be configured to connect to the exhaust end of the barrel. The universal keg may include a first and second inner diameter and may be configured to receive and hold a plurality of different reeds.

In an embodiment, a bellows accessory may be connected to the intake end of the barrel. In an embodiment, an extension tube adapter may be configured to connect to the intake end of the barrel and may further be configured to connect to an extension tube.

In an embodiment, the universal game call may include a reed cap configured to connect to the second call and cover an exposed portion of the second reed.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A universal game call 10 is generally presented. The universal game call 10 includes a plurality of pieces and components described herein that may be connected in various configurations to provide calls for specified animals. The universal game call 10 may be utilized as a kit or in various single or multiple piece arrangements.

Figure 1A:
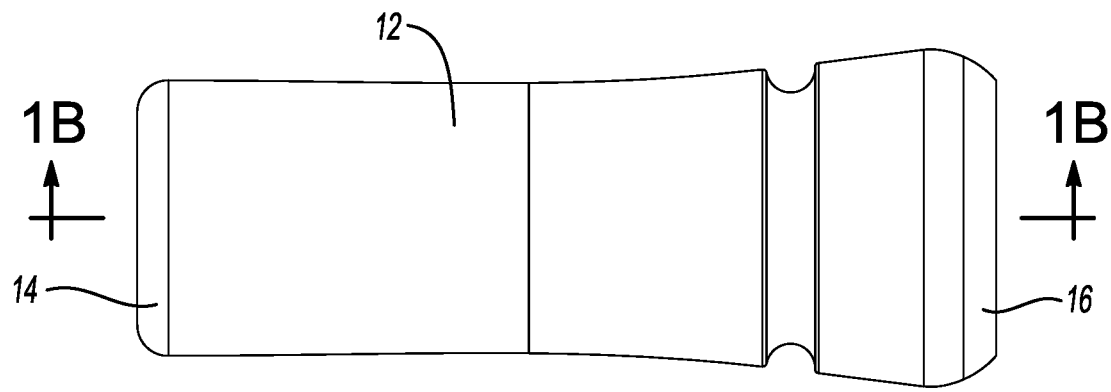
FIG. 1a illustrates a side view of a barrel for a universal game call.
Figure 1B:
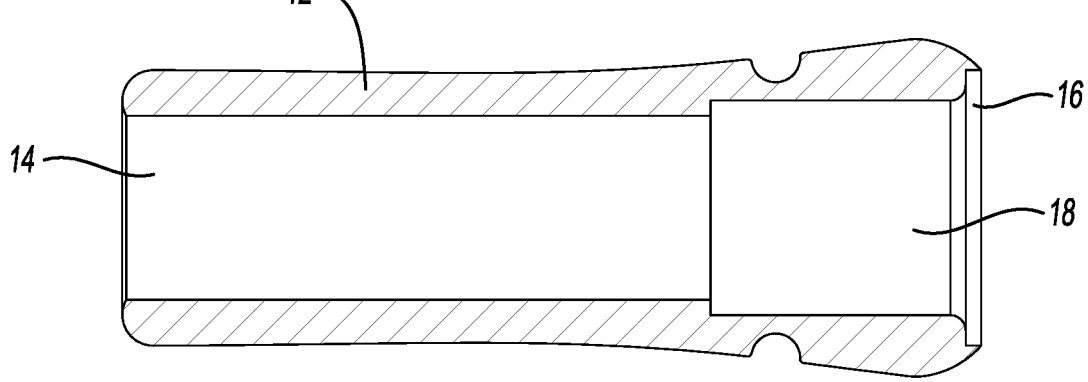
FIG. 1b illustrates a cross sectional view of a barrel for a universal game call.
Figure 1C:
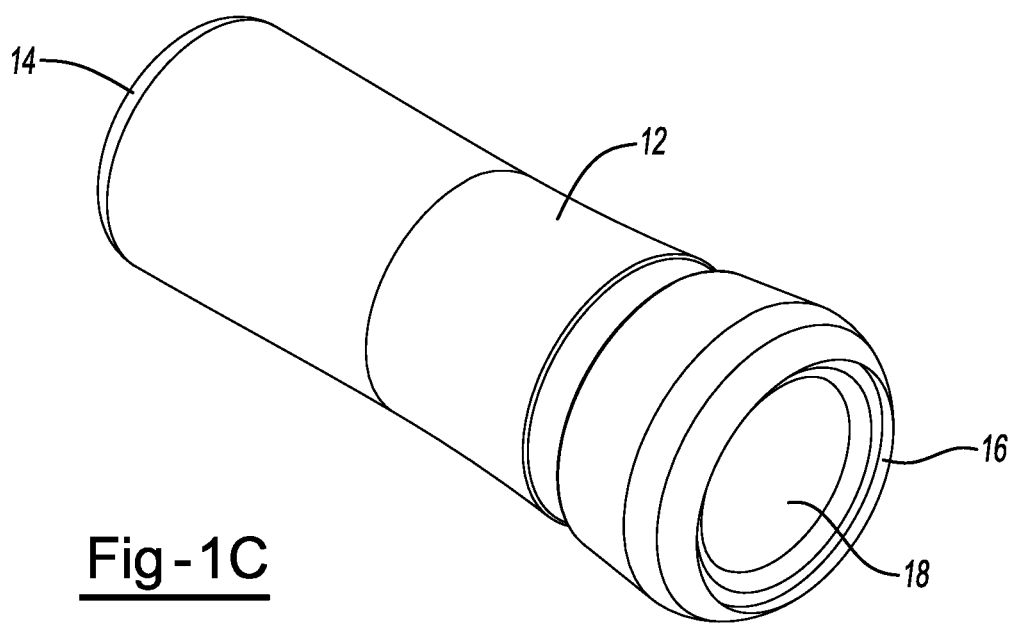
FIG. 1c illustrates a perspective view of a barrel for a universal game call.

With reference to FIGS. 1a-1c, the universal game call 10 includes a barrel 12. The barrel 12 may be generally cylindrical or tubular in shape having a first end 14, a second end 16, and an opening or channel 18 through the body of the barrel between the first and second ends 14, 16. The first end 14 may function as an intake or mouthpiece and the second end 16 may function as an exhaust. The intake 14 may be configured to receive air from a user's mouth that is blown through the channel 18 and exits the barrel 12 through the exhaust 16. It will be appreciated, however, that in some configurations described herein, the functionality of the intake 14 and exhaust 16 may be reversed, such that the exhaust opening 16 receives air from a user's mouth that is blown through the channel 18 and exits through the intake 14.

As shown in FIGS. 1a-1c, the intake 14 and exhaust 16 may have uniquely different geometries. For example, the exhaust end 16 may comprise an opening to the channel with a larger diameter than the mouthpiece opening 14. The channel 18 may taper or jut inward to account for changes in opening size between the intake 14 and exhaust 16.

The intake 14 and exhaust 16 openings may be specifically sized to receive other components therein, as described in further detail below. The components may provide calls and other modifications thereto and may affect how the barrel 12 is used. Specifically, calls or inserts may include a reed that is designed to manufacture the desired sound to attract a target animal. The channel 18 may be sized and shaped to receive the reed therein and allow air to flow through the reed when the call is used. The calls or inserts described herein are examples of calls or components that may be used with the barrel 12. However, it will be appreciated that other calls or inserts may be designed or developed to integrate with the barrel 12 and components described herein.

Figure 2A:
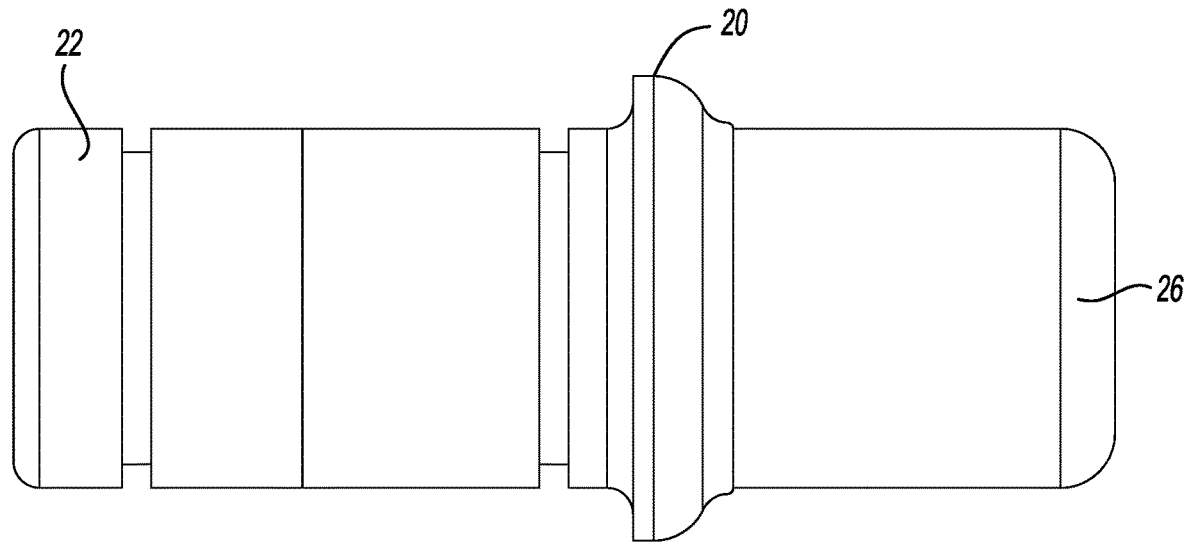
FIG. 2a illustrates a side view of a cow elk bite call.
Figure 2B:
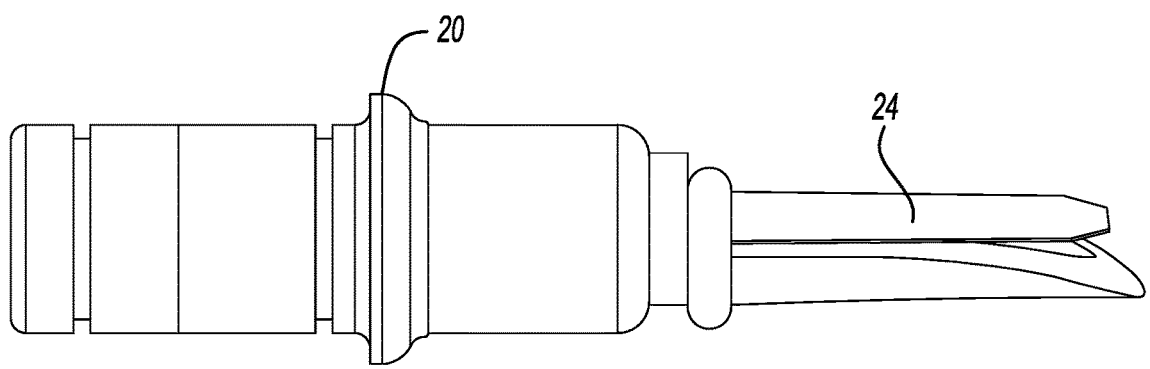
FIG. 2b illustrates a side view of a cow elk bite call with a reed inserted therein.

With reference to FIGS. 2a and 2b, the universal game call 10 may include a bite style cow elk call 20. The bite style cow elk call 20 may be generally hollow and include an insert end 22 at a first end and a mouthpiece end 26 at a second end. The insert end 22 may be configured to be inserted into the exhaust end 16 of the barrel 12. The call may include one or more divots in the insert end 22. The divots may be configured to receive gaskets or O-Rings to seal the connection between the bite style cow elk call 20 and the exhaust opening 16. A reed 24 may be inserted into the mouthpiece end 26 of the call 20 and extend out of the mouthpiece end 26 and away from the call 20. The reed 24 may be designed to provide a cow elk call when air is directed therethrough. By inserting the call 20 into the exhaust end 16 of the barrel 12, the flow through the barrel 12 may be reversed. When the call 20 is connected to the barrel 12, a user may blow into the reed 24 or mouthpiece end 26 of the call 20, forcing air through the call and the reed 24 and out through the barrel intake end 14 to create a cow elk call.

Figure 3A:
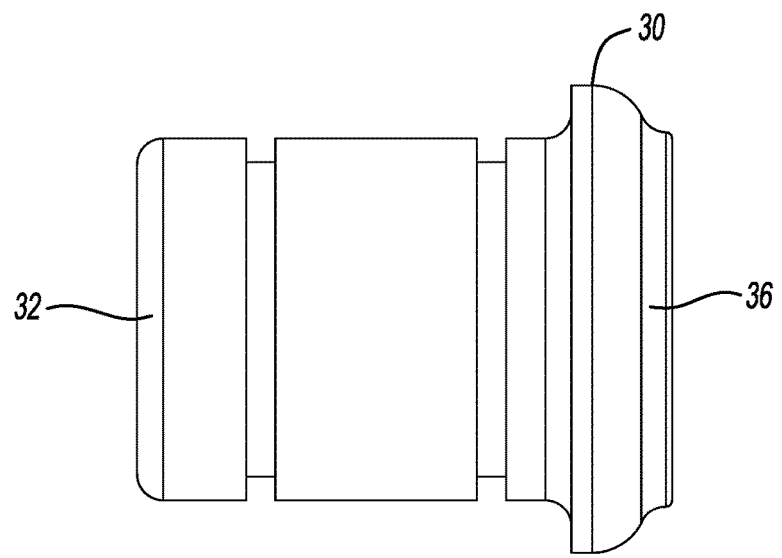
FIG. 3a illustrates a side view of a cow elk open reed call.
Figure 3B:
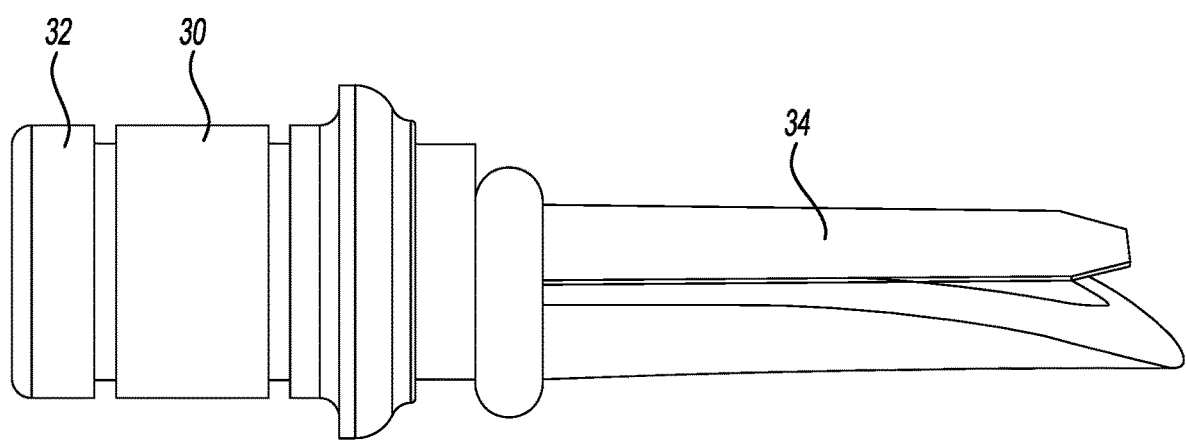
FIG. 3b illustrates a side view of a cow elk open reed call having a reed inserted therein.

With reference to FIGS. 3a and 3b, the universal game call 10 may include a cow elk open reed call 30. The call 30 may be generally hollow and include an insert end 32 at a first end and a mouthpiece end 36 at a second end. The insert end 32 may be configured to be inserted into the exhaust end 16 of the barrel 12. The call may include one or more divots in the insert end 32. The divots may be configured to receive gaskets or O-Rings to seal the connection between the cow elk open reed call 30 and the exhaust opening 16. A reed 34, such as an open reed, may be inserted into the mouthpiece end 36 of the call 30 and extend out of the mouthpiece end 36 and away from the call 30. The reed 34 may be designed to provide a cow elk call when air is directed therethrough. By inserting the cow elk open reed call 30 into the exhaust end 16 of the barrel 12, the flow through the barrel 12 may be reversed. When the call 30 is connected to the barrel 12, a user may blow into the reed 24 or mouthpiece end 36 of the call 30, forcing air through the call and the reed 34 and out through the barrel intake end 14 to create a cow elk call. It will be appreciated that the cow elk open call may also be used as a predator call.

Figure 4A:
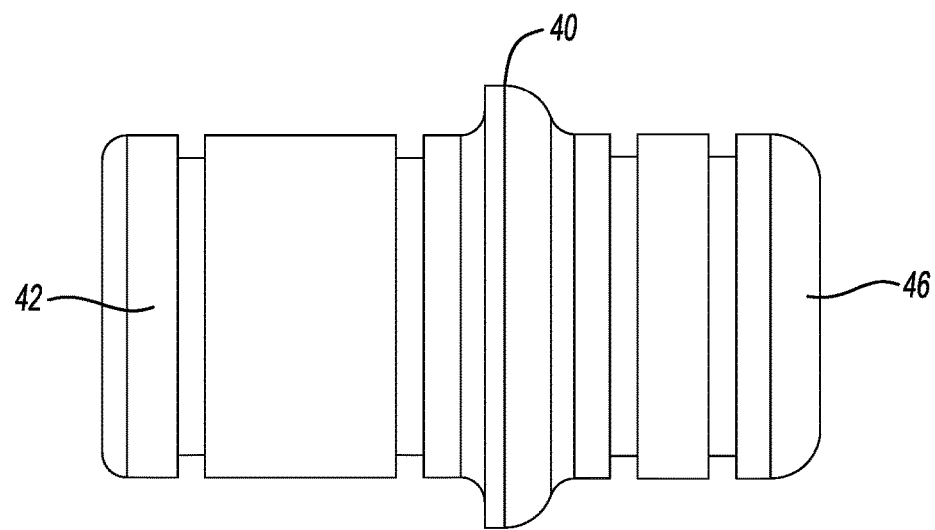
FIG. 4a illustrates a side view of a coyote open reed call.
Figure 4B:
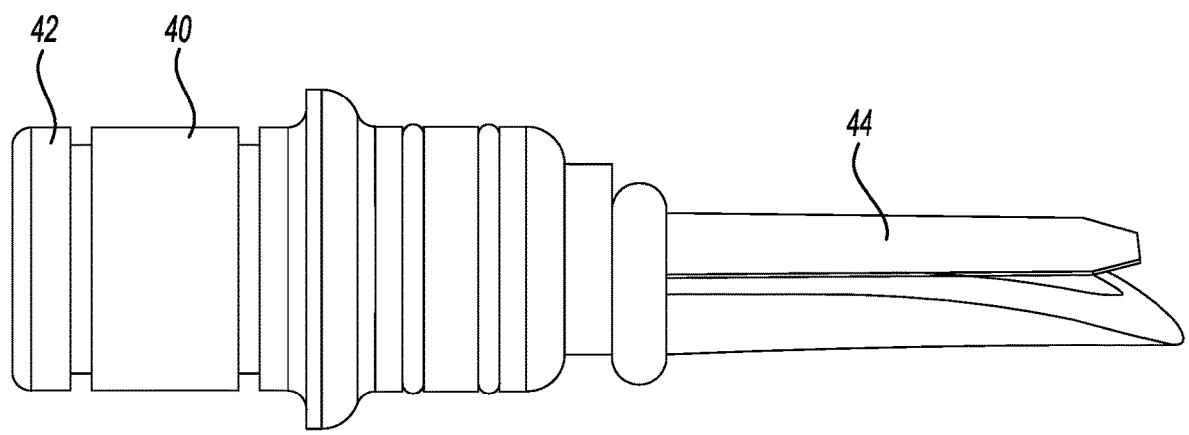
FIG. 4b illustrates a side view of a coyote open reed call having a reed inserted therein.

With reference to FIGS. 4a and 4b, the universal game call 10 may include a coyote open reed call 40. The call 40 may be generally hollow and include an insert end 42 at a first end and a mouthpiece end 46 at a second end. The insert end 42 may be configured to be inserted into the exhaust end 16 of the barrel 12. The call may include one or more divots in the insert end 42. The divots may be configured to receive gaskets or O-Rings to seal the connection between the coyote open reed call 40 and the exhaust opening 16. A reed 44 may be inserted into the mouthpiece end 46 of the call 40 and extend out of the mouthpiece end 46 and away from the call 40. The reed 44 may be designed to provide a coyote call when air is directed therethrough. By inserting the call 40 into the exhaust end 16 of the barrel 12, the flow through the barrel 12 may be reversed. When the call 40 is connected to the barrel 12, a user may blow into the reed 24 or mouthpiece end 46 of the call 40, opposite the insert end 42, forcing air through the call and the reed 44 and out through the barrel intake end 14 to create a coyote call.

Figure 4C:
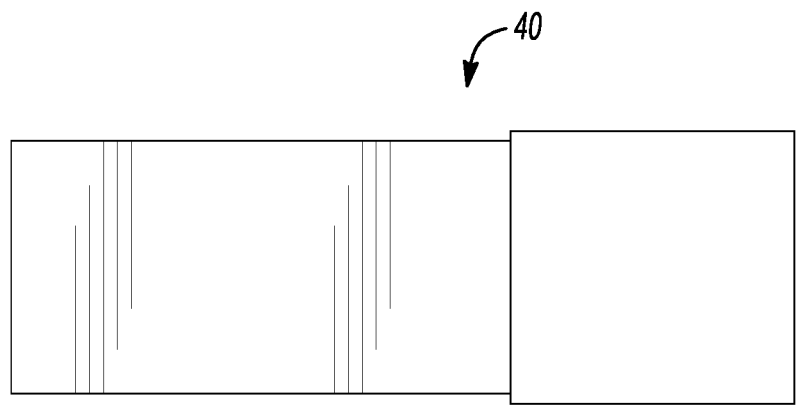
FIG. 4c illustrates a side view of a reed cap.
Figure 4D:
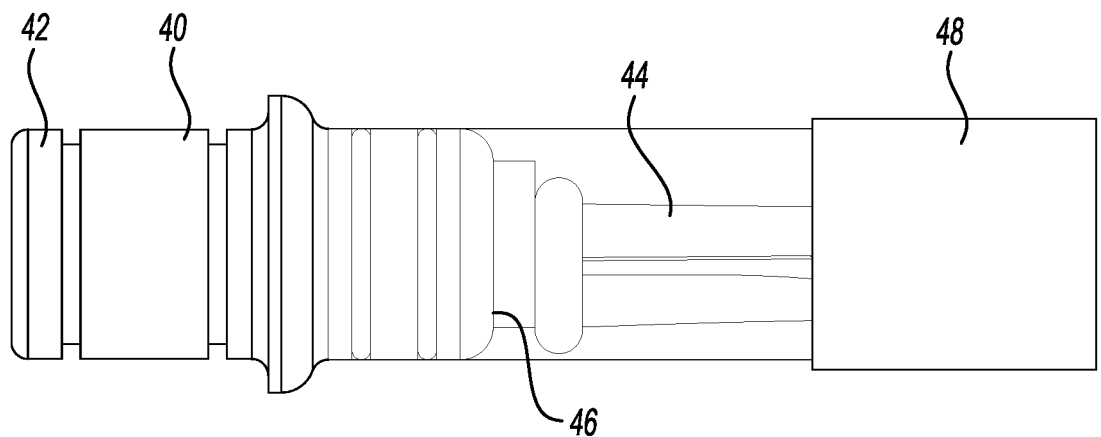
FIG. 4d illustrates a side view of a coyote open call reed inserted into a reed cap.

As illustrated in FIGS. 4c and 4d, the universal game call 10 may include a cap 48. The cap may be generally configured to provide a cover for an exposed reed. The cap may be hollow and have one open end to receive a portion of the call and/or reed therein and connect to the call. For example, as illustrated in FIGS. 4c and 4d, the cap may be sized and shaped to fit over the reed 44 for the coyote open reed call 40. However, it will be appreciated that the cap may be configured to cover and protect any appropriate exposed reed. The call, such as the coyote open reed call 40 shown in FIGS. 4a-4c, may include additional gaskets or O-Rings to seal the connection with the cap 48. The O-Rings may be located near the mouthpiece end 46 and may create a seal with the open end of the cap 48. The cap may be formed of any appropriate material, such as plastic, and may be translucent or partially translucent to allow viewing of the protected reed.

Figure 5A:
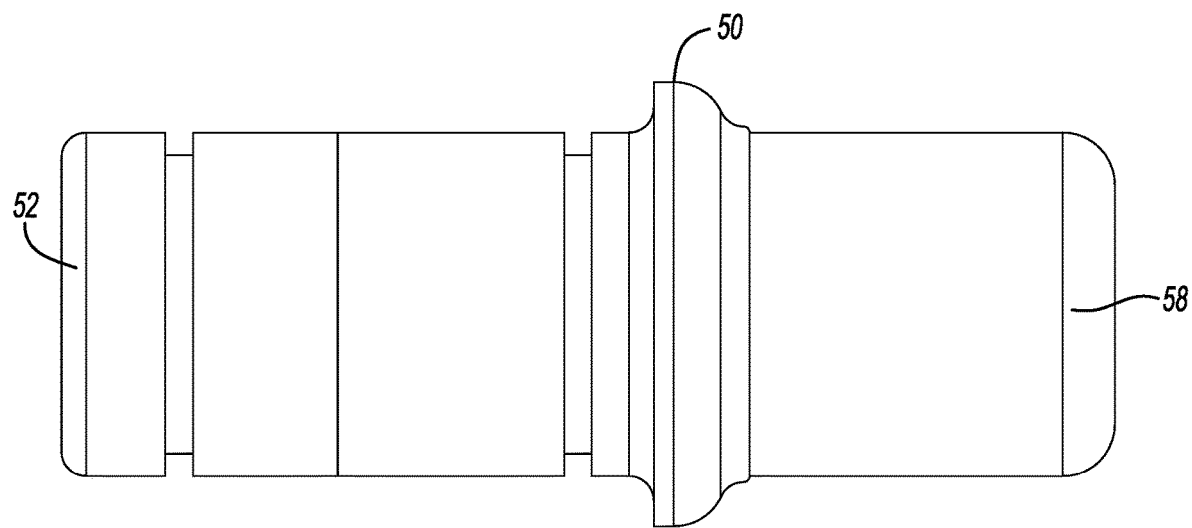
FIG. 5a illustrates a side view of a deer grunt call.
Figure 5B:
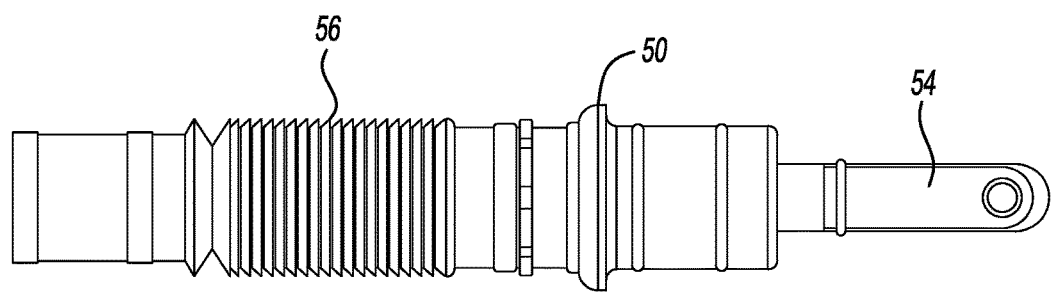
FIG. 5b illustrates a side view of a deer grunt call having a reed inserted therein.

With reference to FIGS. 5a and 5b, the universal game call 10 may include a deer grunt call 50. The deer grunt call 50 may include an insert end 52 at a first end and an exhaust end 58 at a second end. The insert end 52 may be configured to be inserted into the exhaust end 16 of the barrel 12. The call may include one or more divots in the insert end 52. The divots may be configured to receive gaskets or O-rings to seal the connection between the deer grunt call 50 and the exhaust opening 16. A reed 54 may be inserted into the insert end 52 of the call 50 and configured to be inserted into the barrel 12. The reed 54 may be designed to provide a deer grunt call when air is directed therethrough. In an embodiment, an extension tube 56 may be connected to deer grunt call, opposite the reed 54, as shown in FIG. 5b. The exhaust end 58 of the call 50 may be sized and shaped to be inserted into the extension tube 56 and to create a friction fit therewith. When the call 50 is connected to the barrel 12, a user may blow into the intake end 14 of the barrel 12, forcing air through the reed 54 and out through the exhaust end 58 of the call to create a deer grunt call.

Figure 6A:
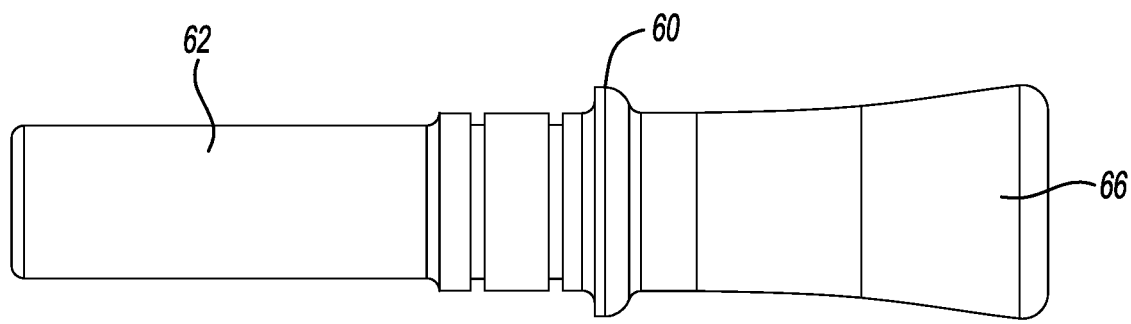
FIG. 6a illustrates a side view of a duck call.
Figure 6B:
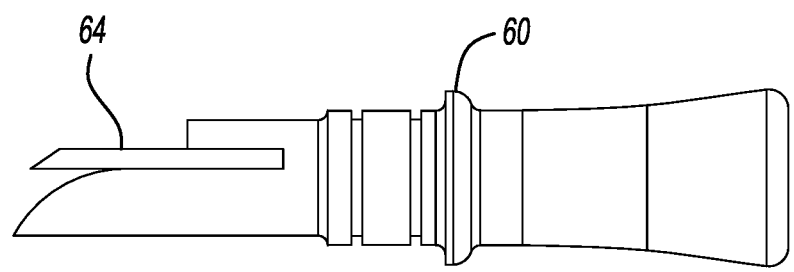
FIG. 6b illustrates a side view of a duck call having a reed inserted therein.

With reference to FIGS. 6a and 6b, the universal game call 10 may include a duck call 60. The duck call 60 may be generally hollow and include an insert end 62 at a first end and an exhaust end 66 at a second end. The insert end 62 may be configured to be inserted into the exhaust end 16 of the barrel 12. The call 60 may include one or more divots in the insert end 62. The divots may be configured to receive gaskets or O-rings to seal the connection between the duck call 60 and the exhaust opening 16. A reed 64 may be inserted into the intake end 62 of the call 60 and configured to be inserted into the barrel 12. The reed 64 may be designed to provide a duck call when air is directed therethrough. When the call 60 is connected to the barrel 12, a user may blow into the intake end 14 of the barrel 12, forcing air through the reed 64 and out through the exhaust end 66 of the call 60 to create a duck call.

Figure 7A:
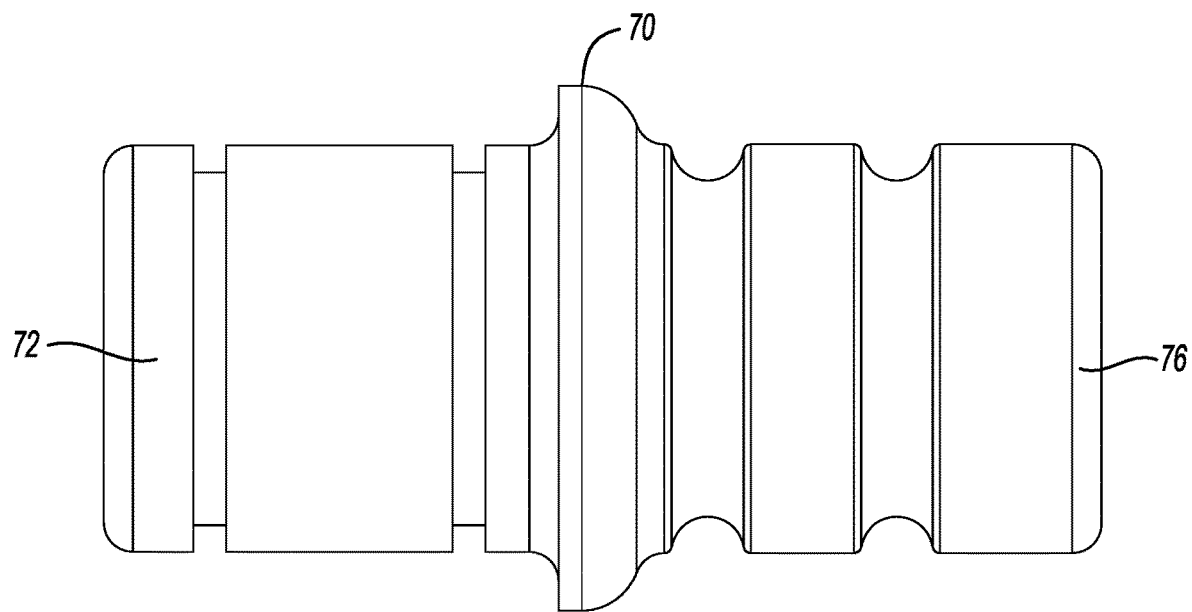
FIG. 7a illustrates a side view of a fawn elk cry call.
Figure 7B:
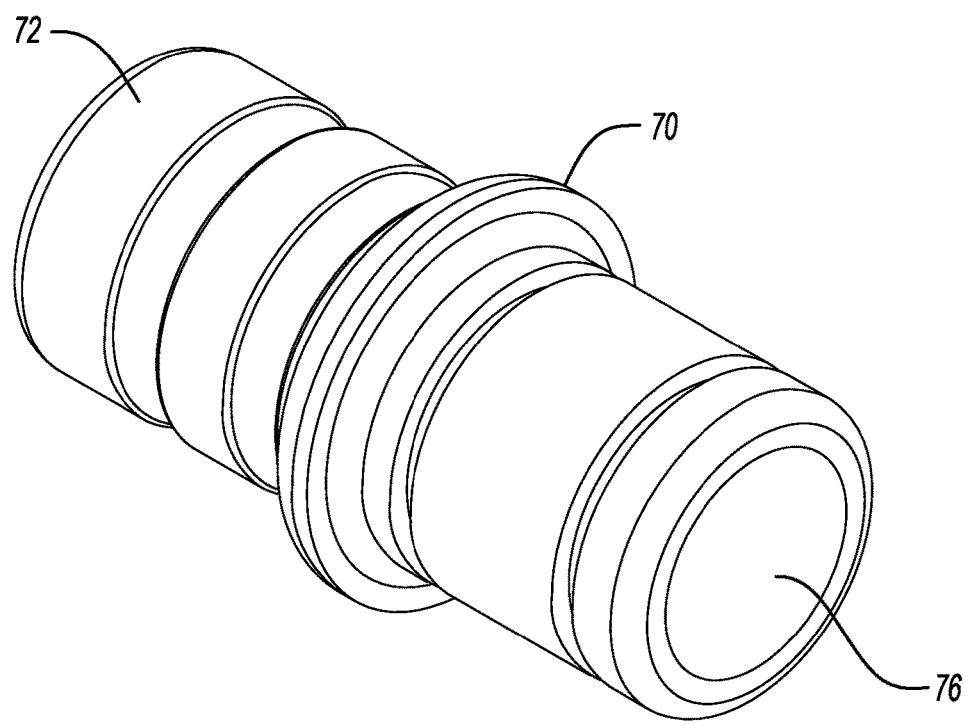
FIG. 7b illustrates a perspective view of a fawn elk cry call.

With reference to FIGS. 7a and 7b, the universal game call 10 may include a fawn elk cry call 70. The fawn elk cry call 70 may be generally hollow and include an insert end 72 at a first end and a mouthpiece end 76 at a second end. The insert end 72 may be configured to be inserted into the exhaust end 16 of the barrel 12. The call may include one or more divots in the insert end 72. The divots may be configured to receive gaskets or O-Rings to seal the connection between the fawn elk cry call 70 and the exhaust opening 16. A reed may be inserted into the mouthpiece end 76 of the call 70 and extend out of the mouthpiece end 76 and away from the call 70. The reed may be designed to provide a fawn elk cry call when air is directed therethrough. By inserting the fawn elk cry call 70 into the exhaust end 16 of the barrel 12, the flow through the barrel 12 may be reversed. When the call 70 is connected to the barrel 12, a user may blow into the reed 24 or mouthpiece end 76 of the call 70, opposite the insert end 72, forcing air through the call 70 and the reed and out through the barrel intake end 14 to create a fawn elk cry call.

Figure 8A:
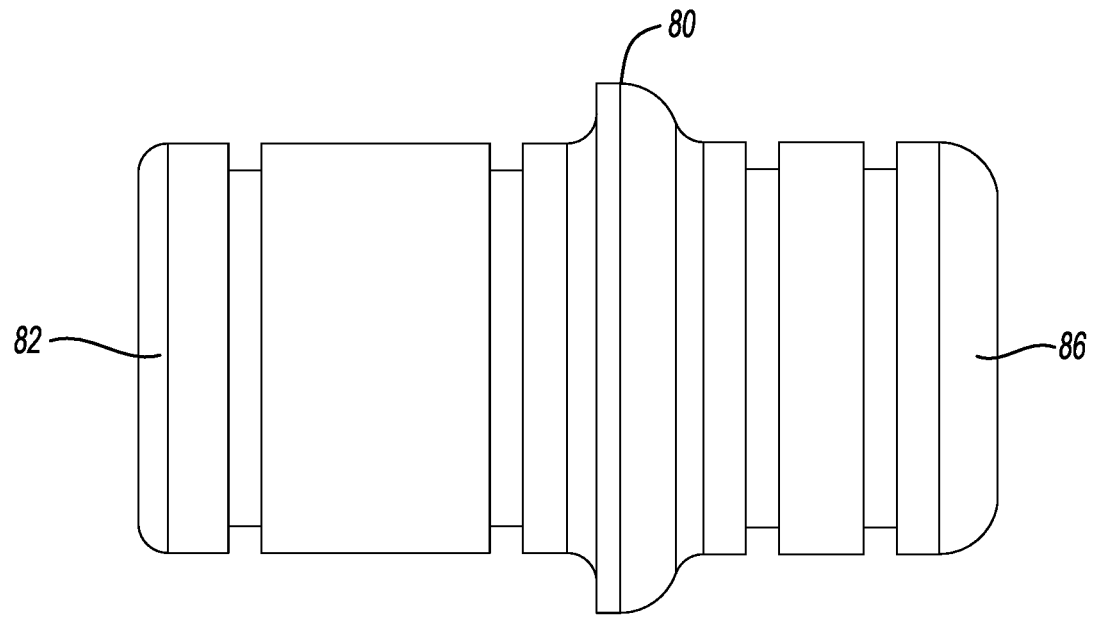
FIG. 8a illustrates a side view of a crow call.
Figure 8B:
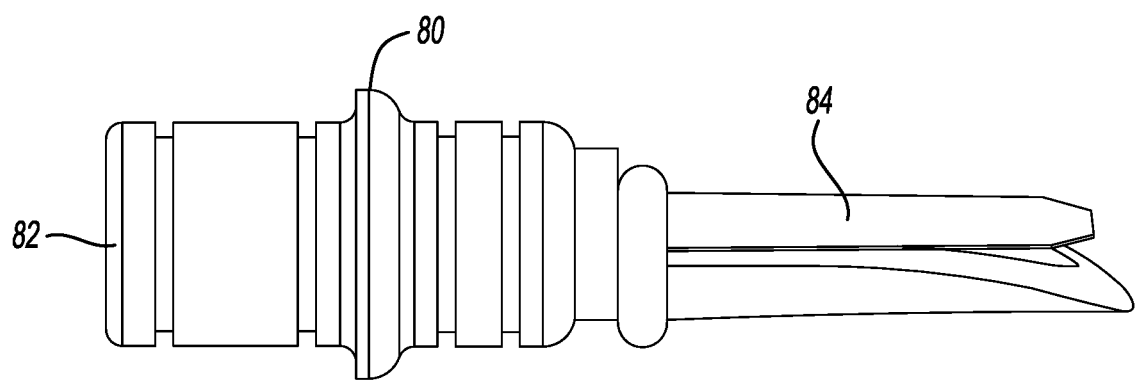
FIG. 8b illustrates a side view of a crow call having a reed inserted therein.

With reference to FIGS. 8a and 8b, the universal game call 10 may include a crow call 80. The crow call 80 may be generally hollow and include an insert end 82 at a first end and a mouthpiece end 86 at a second end. The insert end 82 may be configured to be inserted into the exhaust end 16 of the barrel 12. The call may include one or more divots in the insert end 82. The divots may be configured to receive gaskets or O-Rings to seal the connection between the crow call 80 and the exhaust opening 16. A reed 84 may be inserted into the mouthpiece end 86 of the call 80 and extend out of the mouthpiece end 86 and away from the call 80. The reed 84 may be designed to provide a crow call when air is directed therethrough. By inserting the crow call 80 into the exhaust end 16 of the barrel 12, the flow through the barrel 12 may be reversed. When the call 80 is connected to the barrel 12, a user may blow into the reed 24 or mouthpiece end 86 of the call 80, opposite the insert end 82, forcing air through the call 80 and the reed 84 and out through the barrel intake end 14 to create a crow call.

Figure 9A:
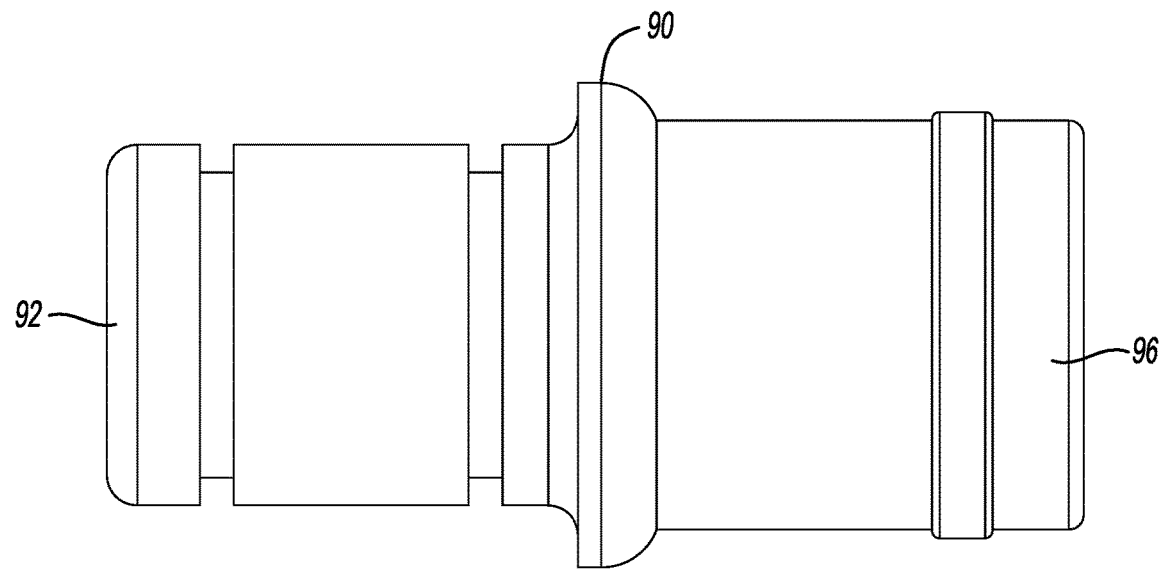
FIG. 9a illustrates a side view of a predator extension tube.
Figure 9B:
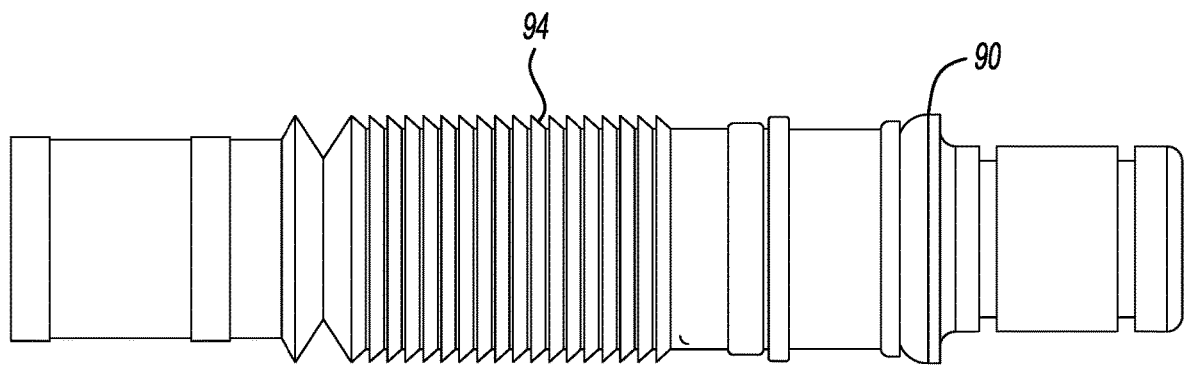
FIG. 9b illustrates a side view of a predator extension tube having a plastic extension tube connected thereto.

With reference to FIGS. 9a and 9b, the universal game call 10 may include a predator extension tube adapter 90 configured to connect to an extension tube 94, similar to the extension tube 56 illustrated in FIG. 5b. The extension tube adapter 90 may include an insert end 92 configured to be inserted into the intake end 14 of the barrel 12 and an exhaust end 96 opposite the insert end 92. The insert end 92 may include one or more divots configured to receive gaskets or O-rings thereon to seal the connection between the extension tube adapter 90 and the intake end 14. The exhaust end 96 may be sized and shaped to receive the predator extension tube 94 thereon and maintain a connection with the extension tube 94 in a friction fit. The predator extension tube adapter 90 may be inserted into the intake end of the intake end 14 of the barrel 12 and used in conjunction with any call that is inserted into the exhaust end 18 of the barrel 12, such as a crow, coyote, or elk call.

Figure 10A:
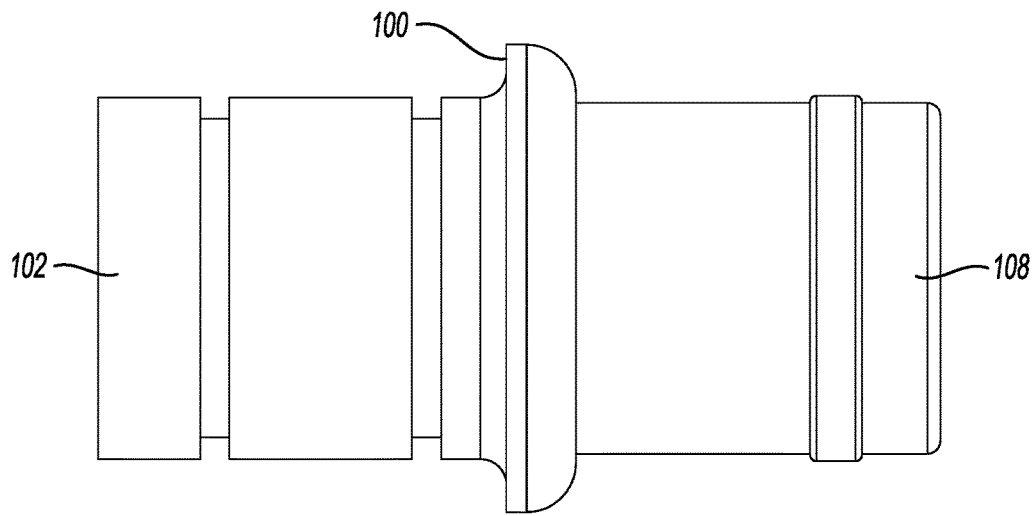
FIG. 10a illustrates a side view of a goose call modified flute.
Figure 10B:
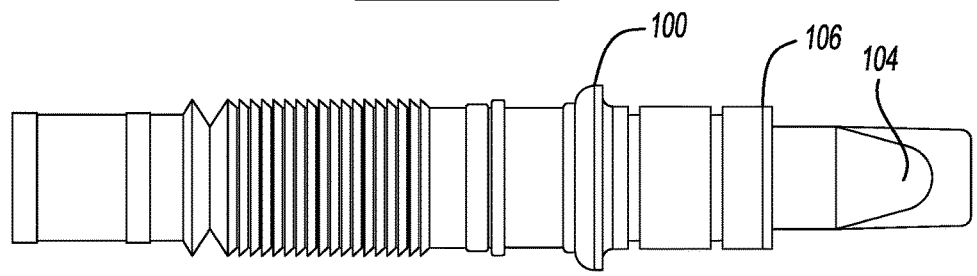
FIG. 10b illustrates a side view of a goose call modified flute having a reed inserted therein and a plastic extension tube connected thereto.

With reference to FIGS. 10a and 10b, the universal game call 10 may include a goose call 100, such as a goose call 100 with a modified flute. The goose call 100 may include an insert end 102 at a first end and an exhaust end 106 at a second end. The insert end 102 may be configured to be inserted into the exhaust end 16 of the barrel 12. The insert end 102 may include one or more divots configured to receive gaskets or O-Rings thereon to seal the connection between the goose call 100 and the mouthpiece opening 14. A reed 104 may be inserted into the insert end 102 of the call 100 and configured to be inserted into the barrel 12. The reed 104 may be designed to provide a goose call when air is directed therethrough. An aluminum tenon 106 may further be inserted into the call 100 for sidewall reinforcement. When the call 100 is connected to the barrel 12, a user may blow into the intake end 14 of the barrel 12, forcing air through the reed 104 and out through the exhaust end 108 of the call to create a goose call.

Figure 11:
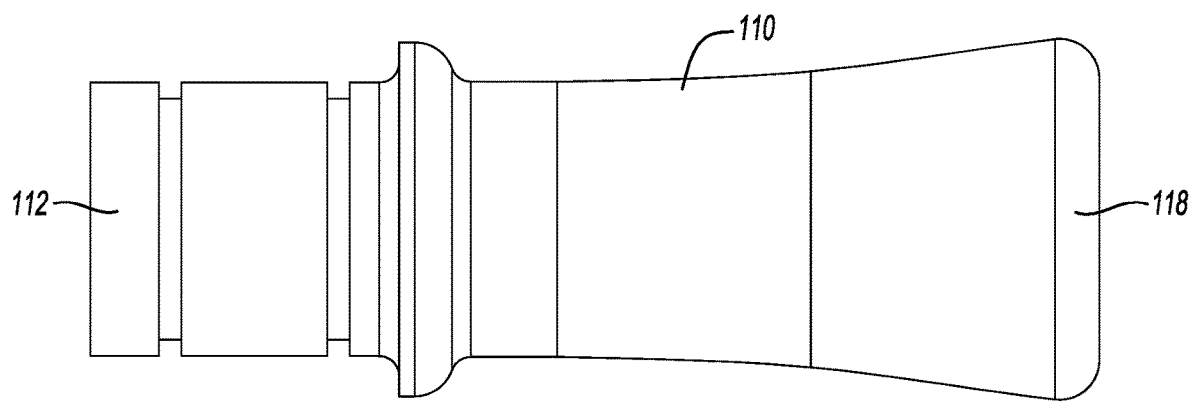
FIG. 11 illustrates a side view of a goose call short reed.

With reference to FIG. 11, the universal game call 10 may include a goose call 110, such as a goose call 110 with a short reed. The goose call 110 may include an insert end 112 at a first end and an exhaust end 118 at a second end. The insert end 112 may be configured to be inserted into the exhaust end 16 of the barrel 12. The insert end 112 may include one or more divots configured to receive gaskets or O-Rings thereon to seal the connection between the goose call 110 and the exhaust opening 16. A reed 114 may be inserted into the insert end 112 of the call 110 and configured to be inserted into the barrel 12. The reed may be designed to provide a goose call when air is directed therethrough. An aluminum tenon may further be inserted into the call 110 for sidewall reinforcement. When the call 110 is connected to the barrel 12, a user may blow into the intake end 14 of the barrel 12, forcing air through the reed 114 and out through the exhaust end 118 of the call to create a goose call.

Figure 12A:
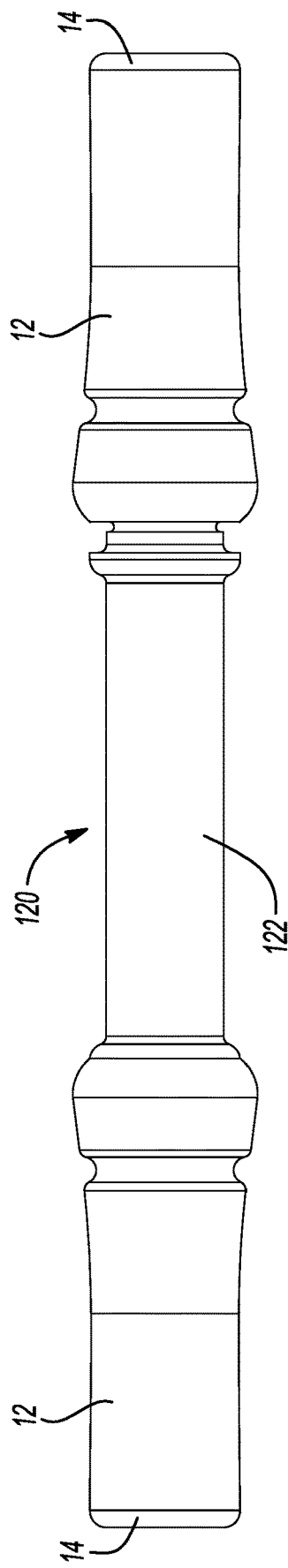
FIG. 12a illustrates a side view of a goose flute call.
Figure 12B:
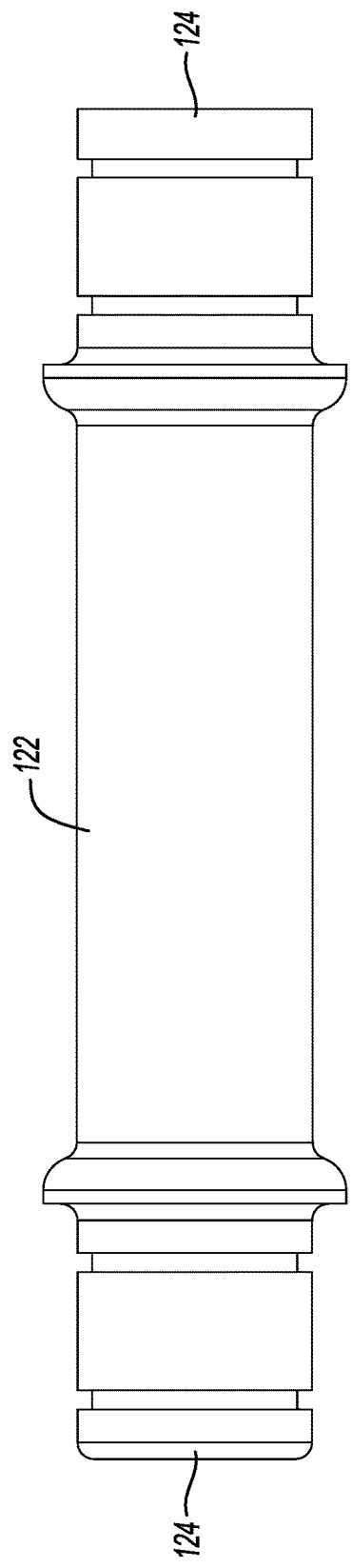
FIG. 12b illustrates a side view of a goose flute neck.

With reference to FIGS. 12a and 12b, the universal game call 10 may include a goose flute call 120. The goose flute call 120 may utilize two barrels 12 interconnected by the goose flute neck 112. The goose flute neck 122 may include two insert ends 124 at opposite ends of the goose flute neck 122, and each insert end 124 may be configured to be inserted into the exhaust ends 16 of each respective barrel 12. A reed (not shown) may be inserted into one insert end 124 of the goose flute neck 122 and into the barrel 12. In use, a user may blow into a first intake end 14 of one barrel 12, forcing air through the call 120 and the reed and out through the second barrel intake 14 to create a goose flute call.

Figure 13A:
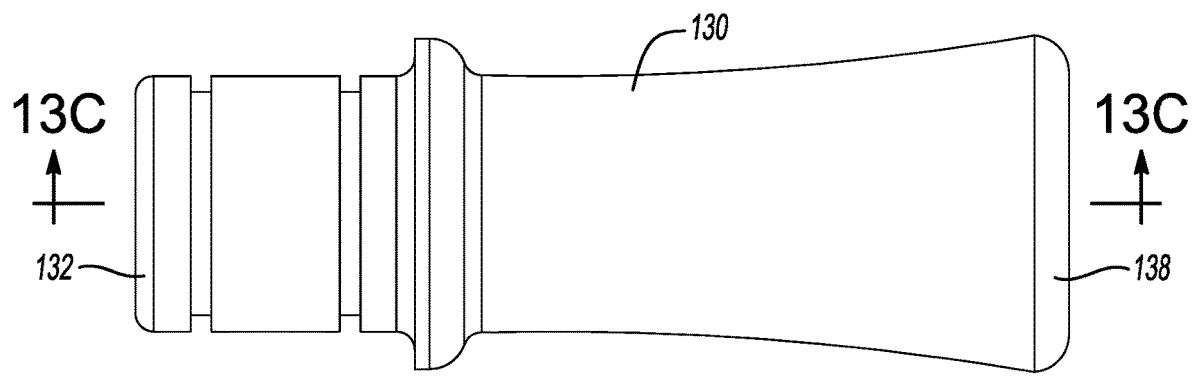
FIG. 13a illustrates a side view of a universal keg.
Figure 13B:
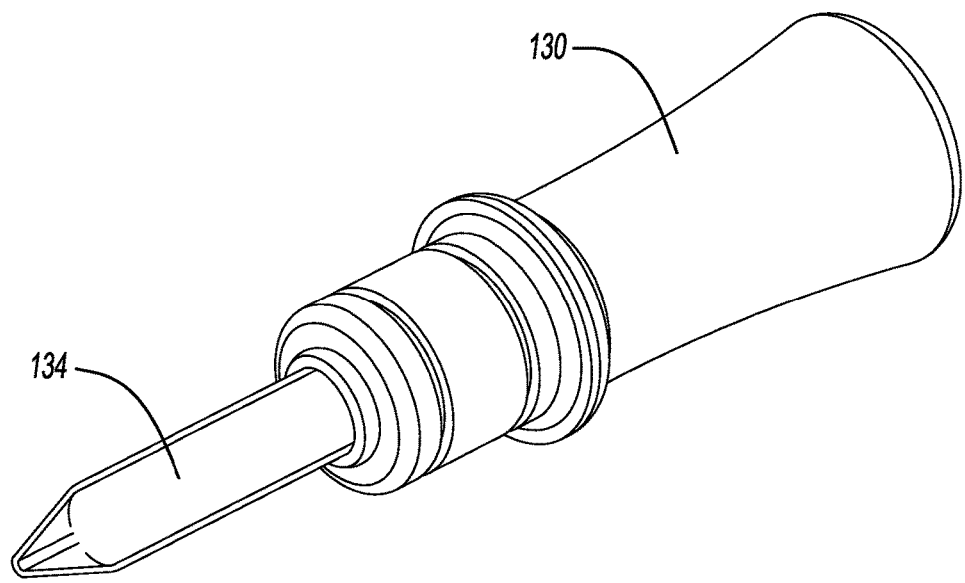
FIG. 13b illustrates a side view of a universal keg having a reed inserted therein.
Figure 13C:
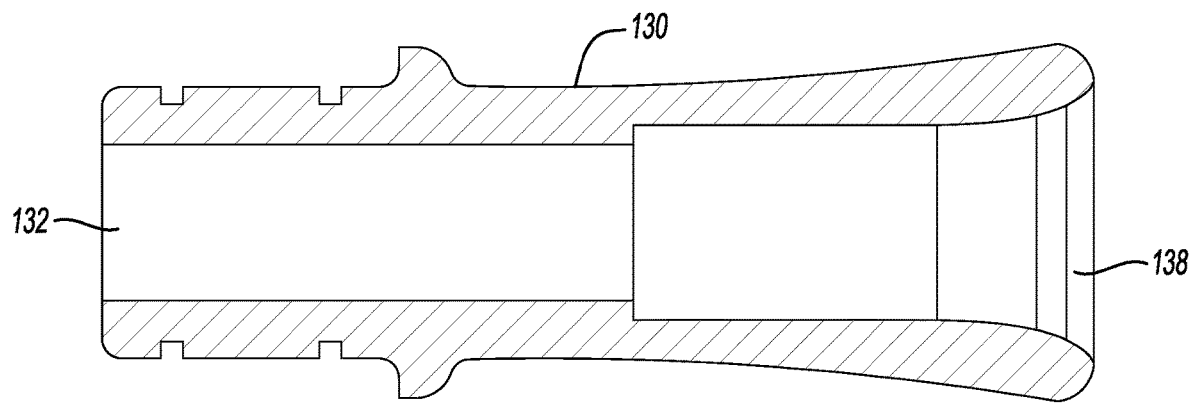
FIG. 13c illustrates a cross-sectional cutaway view of a universal keg.

With reference to FIGS. 13a, 13b, and 13c, the universal game call 10 may include a universal keg 130. The universal keg 130 may be generally hollow and include an insert end 132 at a first end and an exhaust end 138 at a second end. The inner diameter at the insert end 132 may be different, such as smaller, than the inner diameter at the exhaust end 138. The inner diameter at the insert end 132 may extend into the hollow keg 130 for a distance greater than the distance that a corresponding reed is inserted therein to allow for a space to insert a muffling or muting adaptor, such as a rubber grommet, into the first inner diameter, beyond the reed. In an embodiment, the first internal diameter may be larger than the second internal diameter and may be used to allow for additional muffling, extension tubing, or the like. The insert end 132 may be configured to be inserted into the exhaust end 16 of the barrel 12. The insert end 132 may include one or more divots configured to receive gaskets or O-rings thereon to seal the connection between the universal keg 130 and the exhaust opening 16. A reed 134 may be inserted into the insert end 132 of the universal keg 130 and configured to be inserted into the barrel 12. The universal keg 130 may be designed to receive a plurality of different reeds 134 to create any desired call. For example, the universal keg 130 may receive a reed for a wood duck, single reed duck, double reed duck, double reed duck, speckle bellied goose, owl, rabbit, squirrel, woodpecker, raccoon, or other similar animal. The reeds 134 may be grommet secured or taper fit into the universal keg. When the universal keg 130 is connected to the barrel 12, a user may blow into the intake end 14 of the barrel 12, forcing air through the reed 134 and out through the exhaust end 138 of the keg to create the desired call.

Figure 14A:
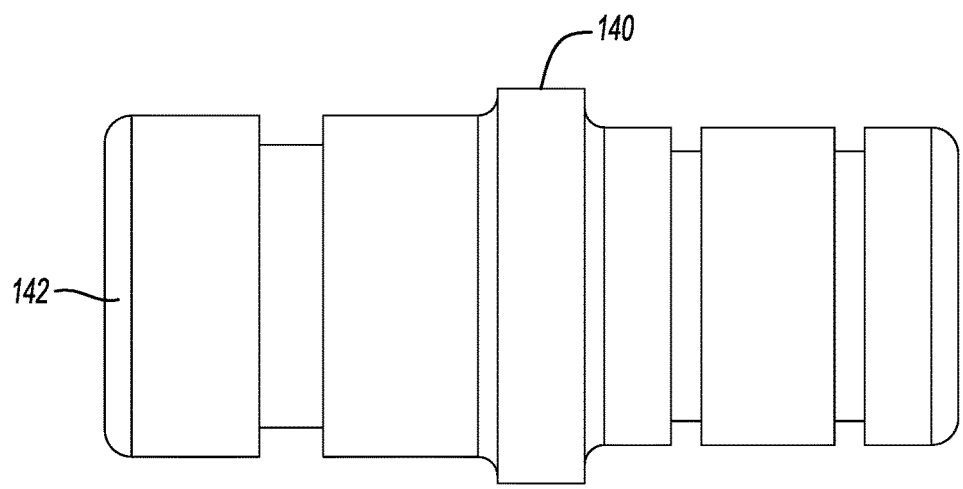
FIG. 14a illustrates a side view of a bellows accessory.
Figure 14B:
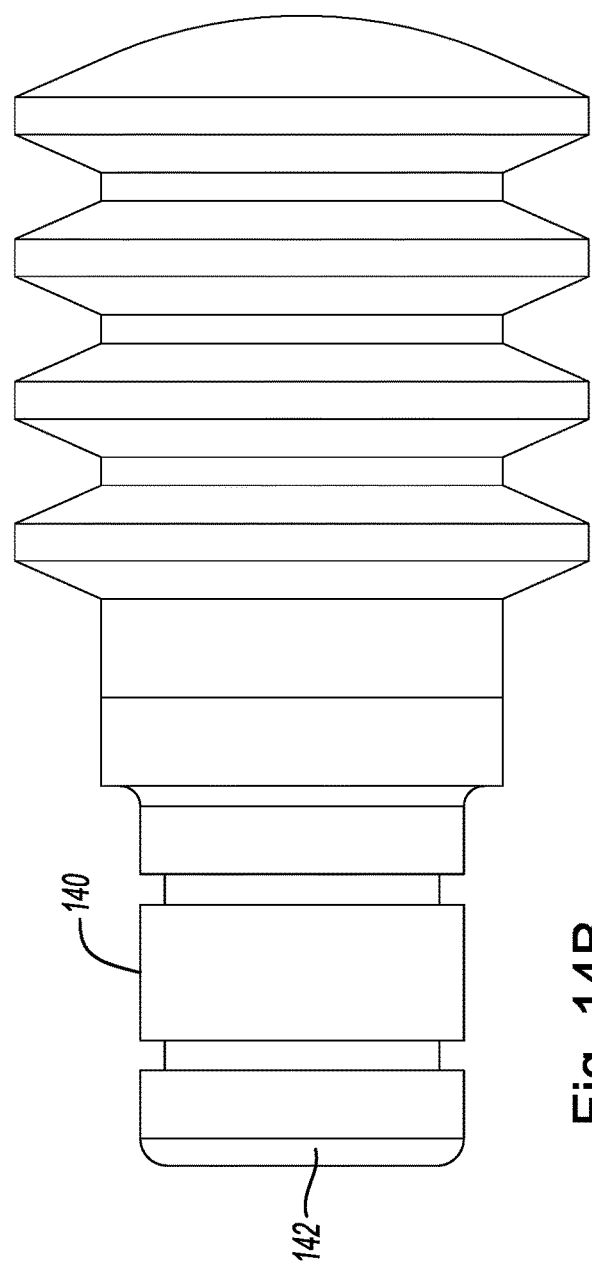
FIG. 14b illustrates a side view bellows accessory having a bellows connected thereto.

With reference to FIGS. 14a and 14b, the universal game call 10 may include a bellows accessory 140. The bellows accessory 140 may include an insert end 142 configured to be inserted into the intake end 14 of the barrel 12. The insert end 142 may include one or more divots configured to receive gaskets or O-rings thereon to seal the connection between the bellows accessory 140 and the intake opening 14. The bellows accessory may be used in conjunction with any other call, such as a squirrel call, to force air through the call.

Figure 16A:
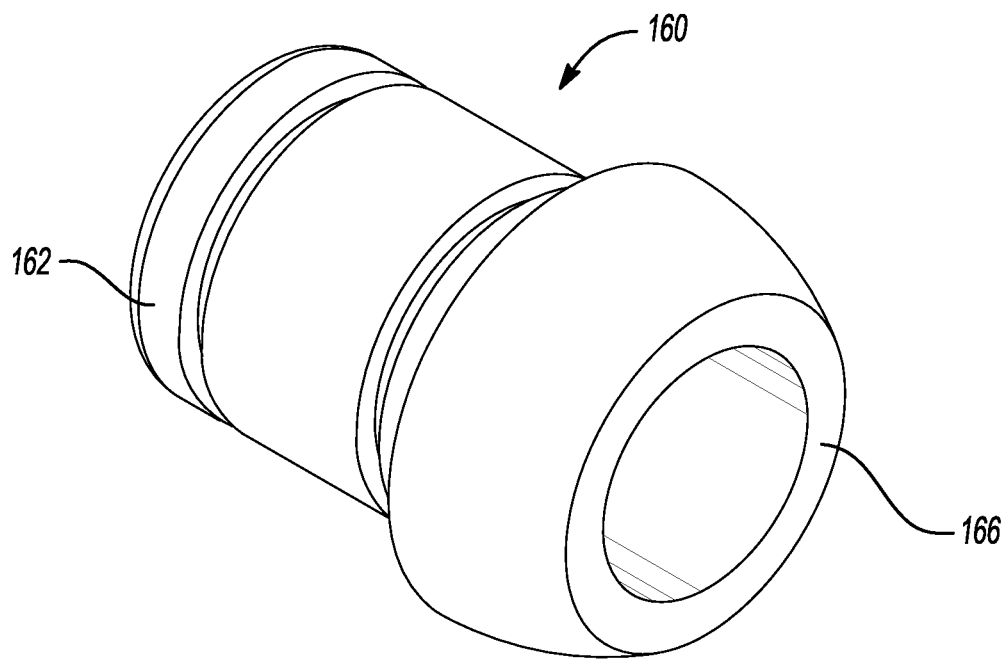
FIG. 16a illustrates a perspective view of a keg adapter.
Figure 16B:
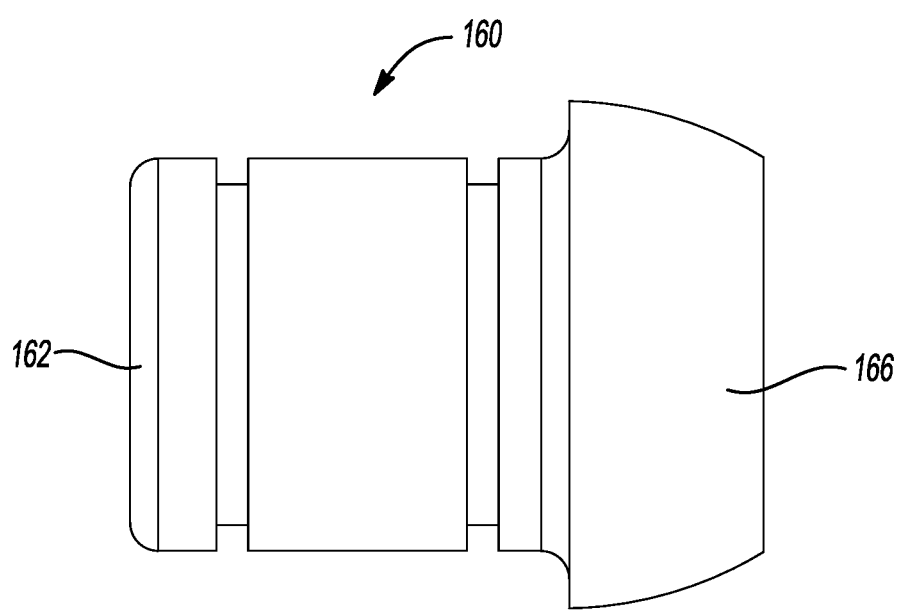
FIG. 16b illustrates a side view of a keg adapter.
Figure 16C:
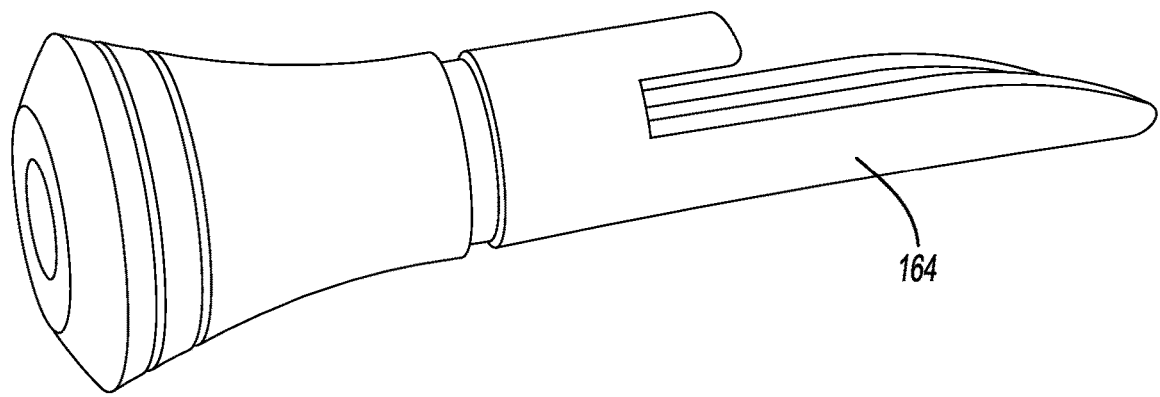
FIG. 16c illustrates a prior art stopper to be used with a keg adapter.
Figure 16D:
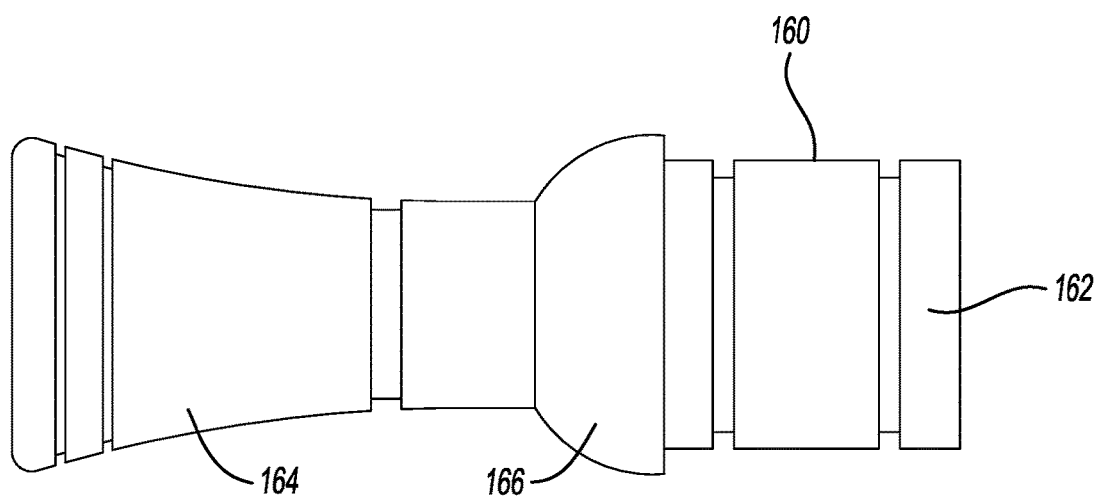
FIG. 16d illustrates a side view of a keg adapter and stopper connected to the exhaust end of the keg adapter.

With reference to FIGS. 16a-16c, the universal game call 10 may include a keg adapter 160. The keg adapter 160 may include an insert end 162 at a first end and an exhaust end 166 at a second end opposite the insert end 62. The insert end 162 may be insertable into the exhaust end 16 of the barrel 12. The exhaust end 166 of the keg adapter 160 may be configured to receive a stopper 164 therein, such as the stopper illustrated in FIG. 16c. The stopper 164 may extend through the hollow opening in the keg adapter 160 and into the barrel 12 when the keg adapter 160 is inserted into the exhaust end 16. A reed (not shown) may be inserted into the stopper and held in place and positioned within the keg adapter 160 and/or barrel 12. When the keg adapter 160 is connected to the barrel 12, a user may blow into the intake end 14 of the barrel 12, forcing air through the stopper 164 and reed to create the animal call of the associated reed.

Figure 15:
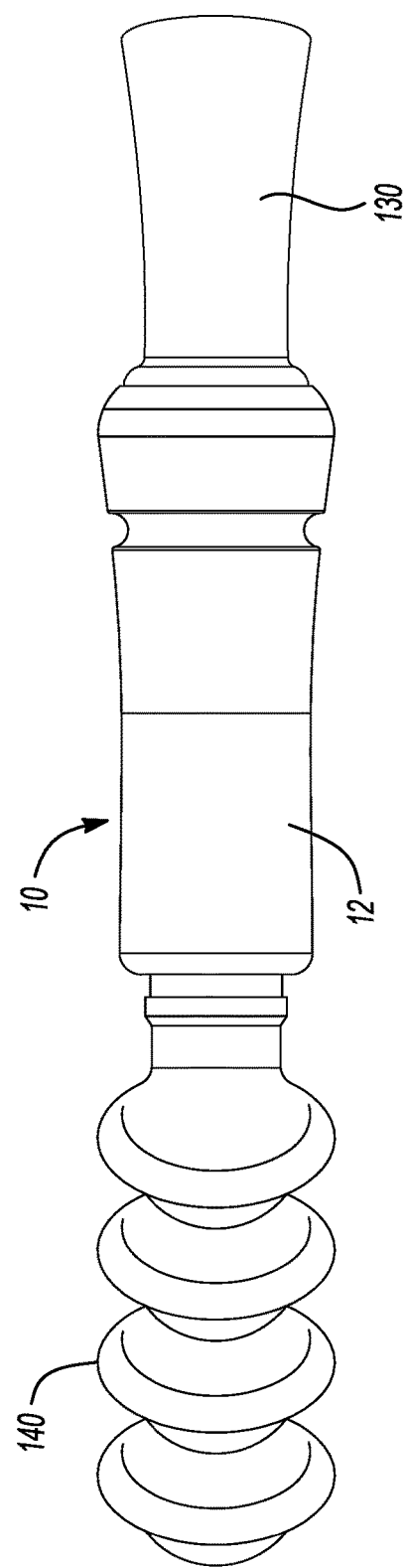
FIG. 15 illustrates an assembled game call comprising a barrel, a keg, a bellows accessory inserted into the mouthpiece.

In use, a desired call may be assembled using the parts set forth and described herein. The assembled call will comprise a barrel 12 and other components connected thereto. The components may be inserted into the intake 14 and exhaust 16 openings of the barrel 12. By way of example, FIG. 15 illustrates an assembled call. The call includes the barrel 12, a universal keg 120 inserted into the exhaust end 16 of the barrel 12, and a bellows accessory 140 inserted into the mouthpiece of the barrel 12. It will be appreciated, however, that other selections of parts may be used to create varying assemblies.

In an embodiment, a universal call 10 may include a barrel, a first call configured to receive a reed at its insert end and extend into the barrel (such as those described herein) and a second call configured to receive a reed at its mouthpiece end and extend away from the call. The universal call 10 may include any number of such calls and other components described herein, and may be reconfigurable to provide the desired animal call.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, I claim:

1. A universal game call comprising:
    a hollow barrel having an open exhaust end and an open intake end, wherein the exhaust end has a first inner diameter and the intake end has a second inner diameter, and wherein the first inner diameter is different from the second inner diameter;
    a first call having a first reed, the first call comprising an insert end and an exhaust end, the insert end configured to be inserted into the exhaust end of the barrel, wherein the first reed is positioned within the insert end of the first call and configured to be inserted into the hollow barrel when the first call is inserted into the exhaust end of the barrel;
    a second call having a second reed, the second call comprising an insert end and a mouthpiece end, the insert end configured to be inserted into the exhaust end of the barrel, wherein the second reed is positioned within the mouthpiece end of the second call and configured to extend out of the mouthpiece away from the second call;
    wherein the universal call is configured to produce a first animal sound when the first call is inserted into the exhaust end of the barrel and air is blown through the intake end of the barrel and exits through the exhaust end of the first call; and wherein the universal call is configured to produce a second animal sound when the second call is inserted into the exhaust end of the barrel and air is blown through the mouthpiece end and second reed and exits through the intake end of the barrel.

2. The universal game call of claim 1, wherein the animal sound produced by the first call is one of a deer grunt call, a duck call, a goose call, a wood duck call, a single reed duck call, a double reed duck call, a speckle bellied goose call, an owl call, a rabbit call, a squirrel call, a woodpecker call, and a raccoon call.

3. The universal game call of claim 1, wherein the animal sound produced by the second call is one of a cow elk call, a coyote call, a fawn elk cry call, and a crow call.

4. The universal game call of claim 1, wherein the first call comprises a universal keg, and wherein the universal keg includes a first inner diameter extending for a length from a first end and a second inner diameter, different than the first inner diameter, extending for a length from a second end, and wherein the universal keg is configured to receive a plurality of different reeds therein.

5. The universal game call of claim 1 wherein the first call is a keg adapter, wherein the keg adapter is configured to receive a stopper therethrough and wherein the stopper is configured to hold a reed.

6. The universal game call of claim 1 further comprising a bellows, wherein the bellows is insertable into the intake end of the barrel.

7. The universal game call of claim 1 further comprising an extension tube adapter, wherein the extension tube adapter includes a first end configured to be inserted into the intake end of the barrel and a second end configured to connect to an extension tube.

8. The universal game call of claim 1, wherein the mouthpiece end of the second call is configured to connect to an extension tube.

9. The universal game call of claim 1, wherein the second call comprises a goose flute call, and wherein the goose flute call includes a first insert end configured to be inserted in the exhaust end of a first barrel and a second insert end, opposite the first insert end, configured to be inserted into the exhaust end of a second barrel, and wherein the first and second insert ends are interconnected by a neck.

10. The universal game call of claim 1, wherein the insert end of the first call and the insert end of the second call includes one or more divots configured to receive O-rings therein.

11. The universal game call of claim 1 further comprising a cap, wherein the cap is configured to connect to the second call and cover an exposed portion of the second reed.

* * * * *